United States Patent [19]
Saethre et al.

[11] 4,130,291
[45] Dec. 19, 1978

[54] SHOPPING CART CAPABLE FOR USE ON STAIRS

[76] Inventors: Magnus Saethre; George Spector, both of 3615 Woolworth Bldg., 233 Broadway, New York, N.Y. 10007

[21] Appl. No.: 740,540

[22] Filed: Nov. 10, 1976

[51] Int. Cl.² .............................................. B62B 5/02
[52] U.S. Cl. .................................................. 280/5.22
[58] Field of Search ...................... 280/5.22, 5.2, 47.2; 180/8 A

[56] References Cited

U.S. PATENT DOCUMENTS

| | | | |
|---|---|---|---|
| 2,193,283 | 3/1940 | Haberson | 280/5.22 |
| 2,902,101 | 9/1959 | Cates | 280/5.22 X |
| 3,420,540 | 1/1969 | Bird | 280/5.22 |
| 4,047,724 | 9/1977 | Shaffer | 280/5.22 |

FOREIGN PATENT DOCUMENTS

| | | | |
|---|---|---|---|
| 808411 | 7/1951 | Fed. Rep. of Germany | 280/5.22 |
| 1084143 | 6/1960 | Fed. Rep. of Germany | 280/5.22 |
| 2362340 | 7/1974 | Fed. Rep. of Germany | 280/5.22 |
| 120716 | 11/1970 | Norway | 280/5.22 |

Primary Examiner—John A. Pekar

[57] ABSTRACT

A conventional shopping cart is disclosed which is capable to climb a stairway either up or down in a manner that is less exhausting to a person; the cart including an endless track that can be swung outwardly from a retracted, out-of-the-way position so to rest across several steps while being pulled, and the track frame also having legs for automatically holding the cart from rolling down the stairs so that a person can stop to rest at any point along a stairway without need of holding the cart with his hand.

3 Claims, 5 Drawing Figures

U.S. Patent  Dec. 19, 1978  4,130,291
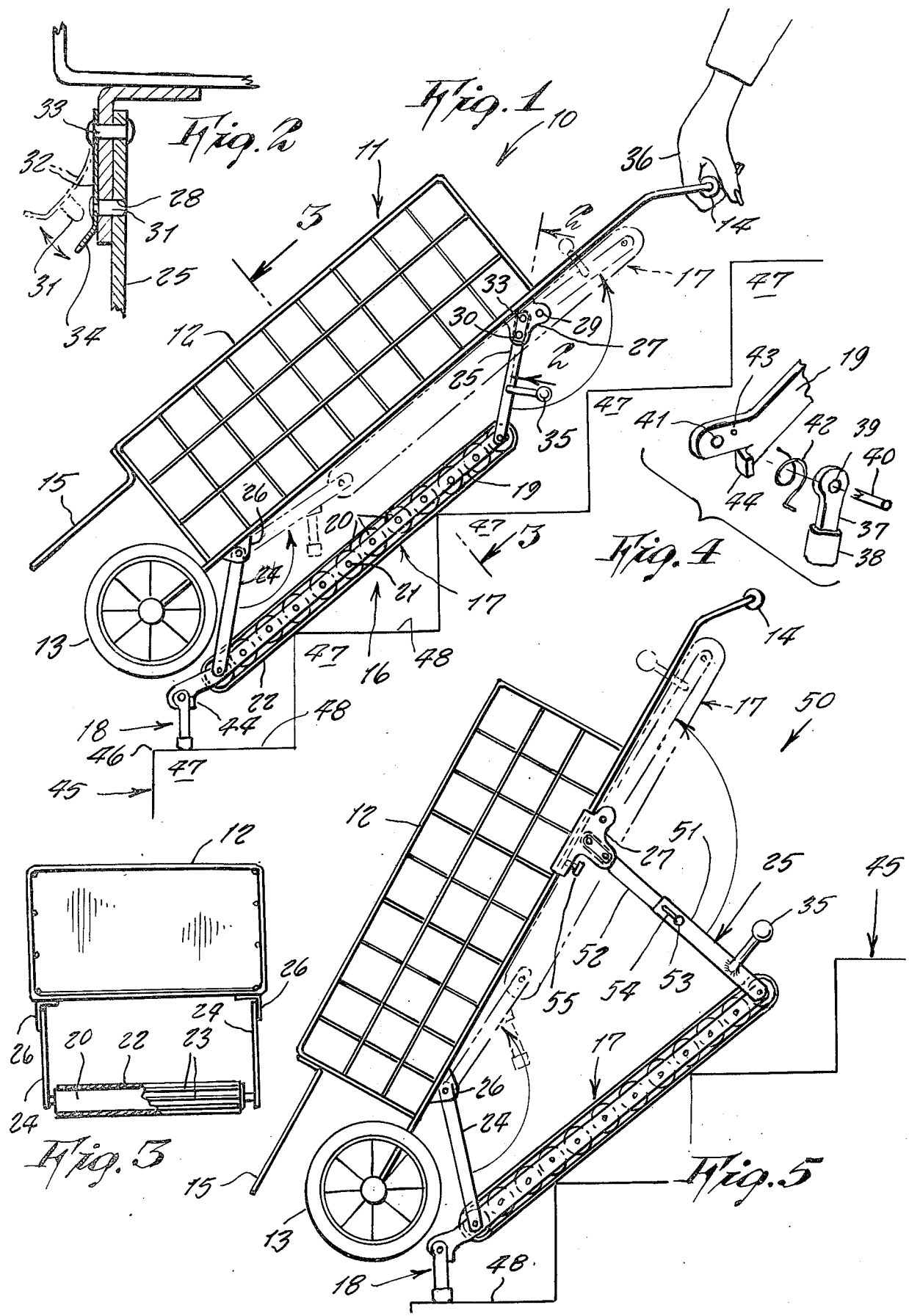

SHOPPING CART CAPABLE FOR USE ON STAIRS

This invention relates generally to shopping carts such as are used by housewives when going to shop for food at a supermarket or other stores.

It is generally well known that it is a difficult task for a woman to pull a heavily loaded shopping cart up a stairway of a private home, or an apartment house, particularly when such stairways are long, with many steps, so that she is exhausted before reaching the top. This is an objectionable situation and dangerous because in an exhausted condition, she is more liable to fall, and the situation is therefore, in need of an improvement.

Accordingly, it is a principal object of the present invention to provide a shopping cart which can be dragged up a stairway instead of being lifted from one step to another, so that less effort is required.

Another object is to provide a shopping cart which can be automatically stopped at any desired step so that a tired person can rest to refresh, before continuing to get the cart up the rest of the stairs.

Another object is to provide a shopping cart which by preventing excessive exhaustion of a person, with a heavy load, promotes safety so that the person is not so tired that she might loose her footing or possibly accidentally release her grip of the cart.

Still aother object is to provide a shopping cart which equally aids a person moving a heavily loaded cart downwardly on a stairs.

Still a further object is to provide a shopping cart capable for use on stairs, wherein the stair climbing structure thereof is retractable, so to be out-of-the-way when not needed, and which does not in any way interfere with the normal use of the cart.

Other objects are to provide a shopping cart capable for use on a stairs which is simple in design, inexpensive to manufacture, rugged in construction, easy to use and efficient in operation.

These and other objects will be readily evident upon a study of the following specification and the accompanying drawing, wherein:

FIG. 1 is a side view of one design of the invention shown in operative use.

FIG. 2 is an enlarged cross-sectional view on line 2-2 of FIG. 1.

FIG. 3 is a cross-sectional view on line 3—3 of FIG. 1.

FIG. 4 is an exploded perspective view of components of a resting leg of the invention.

FIG. 5 is a view similar to FIG. 1, and showing a modified design of the invention.

Referring now to the drawing in greater detail, and more particularly to FIGS. 1 through 4 thereof, at this time, the reference numeral 10 represents a shopping cart assembly according to the present invention wherein there is a conventional shopping cart 11 that includes a wire basket 12 supported upon a pair of wheels 13. A handle 14 is provided for pushing or pulling the cart, and a foot 15 serves to hold the cart upright while at rest.

In the present invention, the cart 11 has an accessory 16 secured thereto which includes a endless track 17 and a rest leg 18.

The endless track includes a pair of side frames 19 between which a plurality of rollers 20 are rotatably free on pins 21 supported in the frames. An endless belt 22 having cleats 23 on its outer side extends around all the rollers. The opposite ends of the frames are pivotally attached to ends of levers 24 and 25 which at these opposite ends are pivotable on brackets 26 and 27 respectively, that are rigidly welded or otherwise secured to the basket.

The bracket 27 includes a means for rigidly the holding the endless track in either extended, operative position (as shown by the solid lines in FIG. 1) or in a retracted position (as shown by the phantom lines of the same figure) and wherein it rests flush with a side of the basket. This consists of an opening 28 on the lever 25 which selectively aligns with openings 29 and 30 on the bracket 27, and a pin 31 on an end of a leaf spring 32 secured under pivot pin 33, so that in a retracted position of the track, the pin 31 engages through openings 28 and 29, while in an extended position of the track, the pin 31 engages through openings 28 and 30. The pin 31 thus locks the track rigidly in either position. A bent end 34 allows quick and easy lifting of the leaf spring so to disengage the pin 31 from the openings when changing a track position, after which the spring snaps the pin into the selected opening.

A handle 35 is provided for conveniently being grasped by a person's hand 36 when wishing to change a track position, the handle being welded to the lever 25.

The rest leg 18 consists of a leg 37 having a rubber cap 38 on one end and an opening 39 on the other end for pivoting about a pin 40 supported in openings 41 in the ends of the side frames 19. A coil spring 42 around the pin 40 is secured at one end in a hole 43 in the frame, the other end of the spring bearing against the post so to normally hold the leg pivoted against a stop 44 struck out and bent out on the side frame 19.

In operative use, it is now evident that a heavily loaded cart can climb a stairway 45 by being tilted over so the belt 22 rests across the corners 46 of several steps 47. By grasping the cart handle 14 with the hand 36 the cart will thus travel upward on the endless track which is in the extended position as shown in FIG. 1. As it travels upwardly, the rest legs pivot out to clear the stair corners 46 and then snap back into the vertical position shown and wherein they rest against the stop 44. Should a person wish to rest before reaching a top of the stairway, she simply allows the cart to halt by letting it backward sufficiently until the leg 18 rests against the top tread 48 of a stair. Thus the cart is prevented from sliding down the stairway.

In FIG. 5 a modified design of shopping cart assembly 50 is generally as same as the above described shopping cart assembly 10, and like parts are indicated with like reference numerals in the figure. However, the assembly 50 is designed so that a person needs not bend down as far in order to hold the cart handle while pulling it up a stairway. Additionally, the design of assembly 50 permits the angle of the cart 11 respective to the extended endless track to be adjustable so to accommodate steps that are either more or less steep and also to have the cart handle 14 higher or lower so to suit a person who may be taller or shorter.

In this design, the lever 25 is adjustable in length by consisting of telescopic bars 51 and 52 rigidly securable together in a selected position by a set screw 53 extending through a slot 54 in bar 51 and threadingly engaged in bar 52. Thus in an extended position, the upper end of the track is swung farther from the cart than a lower end thereof, as shown, and the cart 11 is thus tilted more upwardly. In order that the track can rest flush with a side of the cart basket when not in use, as shown by phantom lines, the bracket 27 is not welded to the basket but must be slidable thereon so to be adjustably secured thereto by set screws 55, the position of bracket 27 being determined by the extended length of lever 25. Thus a modified design is provided.

In descending a stairway with a heavily loaded cart, the cart is used in same manner as described above, except that in order for the vertically extending leg 18 to clear the stair or step corner 46, the handle 14 must be downwardly dipped so to rock the cart and thus raise the leg 18 as it approaches each step, and which is an easy task to do.

While various changes may be made in the detail construction, it is understood that such changes will be within the spirit and scope of the present invention, as is defined by the appended claims.

What is claimed is:

1. A shopping cart adapted for use on flat surfaces and stairways, comprising a basket mounted on a frame including a front end with a handle and a rear end with a pair of wheels in further combination with a retractable endless mechanism track secured at front and rear ends to the frame between the handle and wheels, said frame and track mechanism including coacting securing means for pivoting said track mechanism from a lower position spaced from said frame and wheels to an upper position flush with said frame whereby said track mechanism is located beyond said wheels to fully engage stairs when in the lower position and whereby said wheels are free to fully engage flat surfaces when the track is in the upper position, including means for securing the track mechanism in said positions and a rear stop mounted resiliently on said rear end of said track mechanism to provide automatic vertical support when the cart is at rest on a stairway, wherein the said coacting securing means comprise a pair of lever means pivotally secured to the frame at longitudionally spaced points, said lever means being also pivotably secured at opposite ends to said track mechanism and wherein the said means for securing the track in said positions comprise brackets mounted on said frame pivotally secured to one of said pair of lever means, said brackets having spaced holes that align with corresponding holes in one pair of said lever means corresponding to the upper and lower positions, and including a pin for removably locking said one of said pair of lever means and bracket at said positions.

2. A cart as in claim 1, wherein said one of said pair of lever means include adjustable members connecting the track mechanism to the frame for adjusting the length of said one of said pair of lever means thereby affixing the track mechanism at varying inclinations relative to said frame.

3. A cart as in claim 1, wherein said one of said pair of lever means is of adjustable length and said bracket is longitudinally adjustable along said frame.

* * * * *